April 19, 1927.
W. L. PAUL
SUBSOIL PLOW
Filed Aug. 25, 1924
1,625,278
3 Sheets-Sheet 2
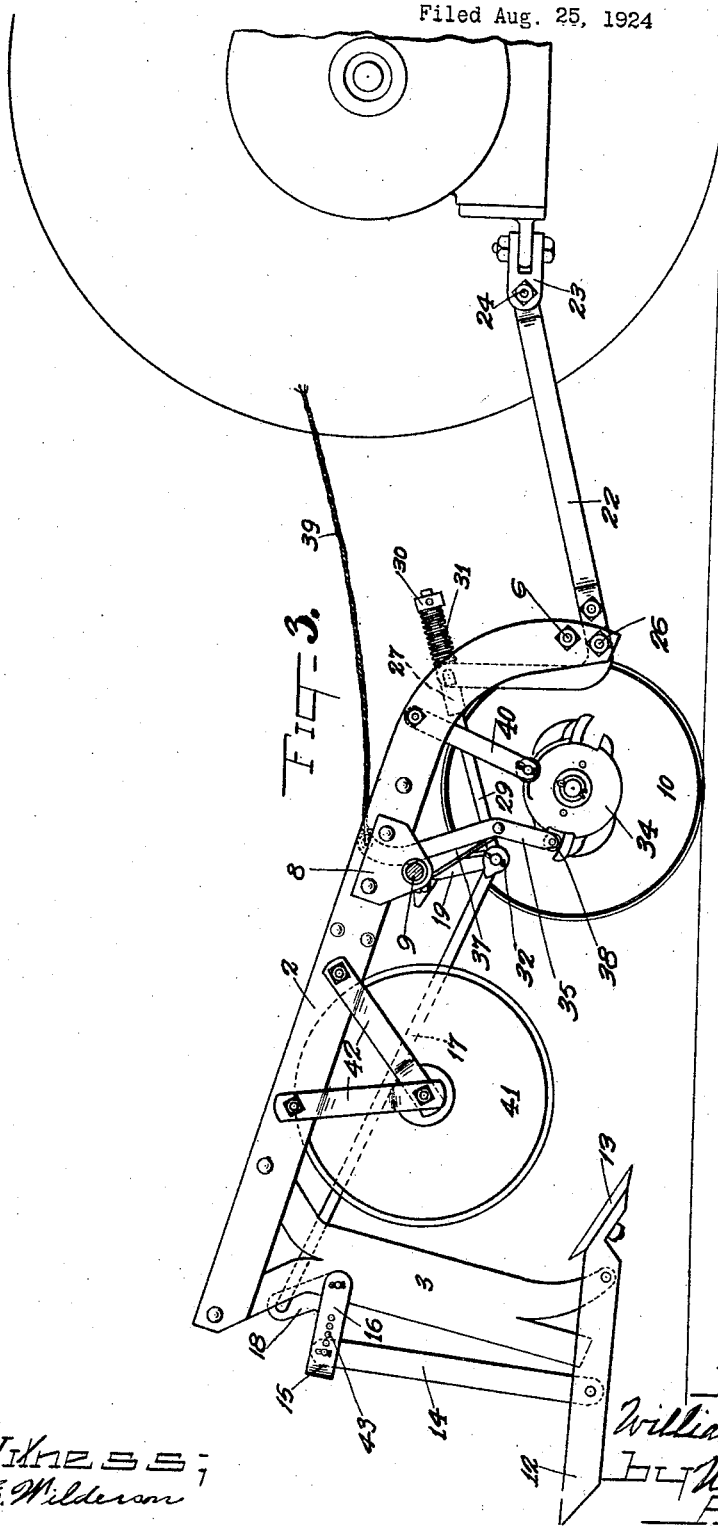

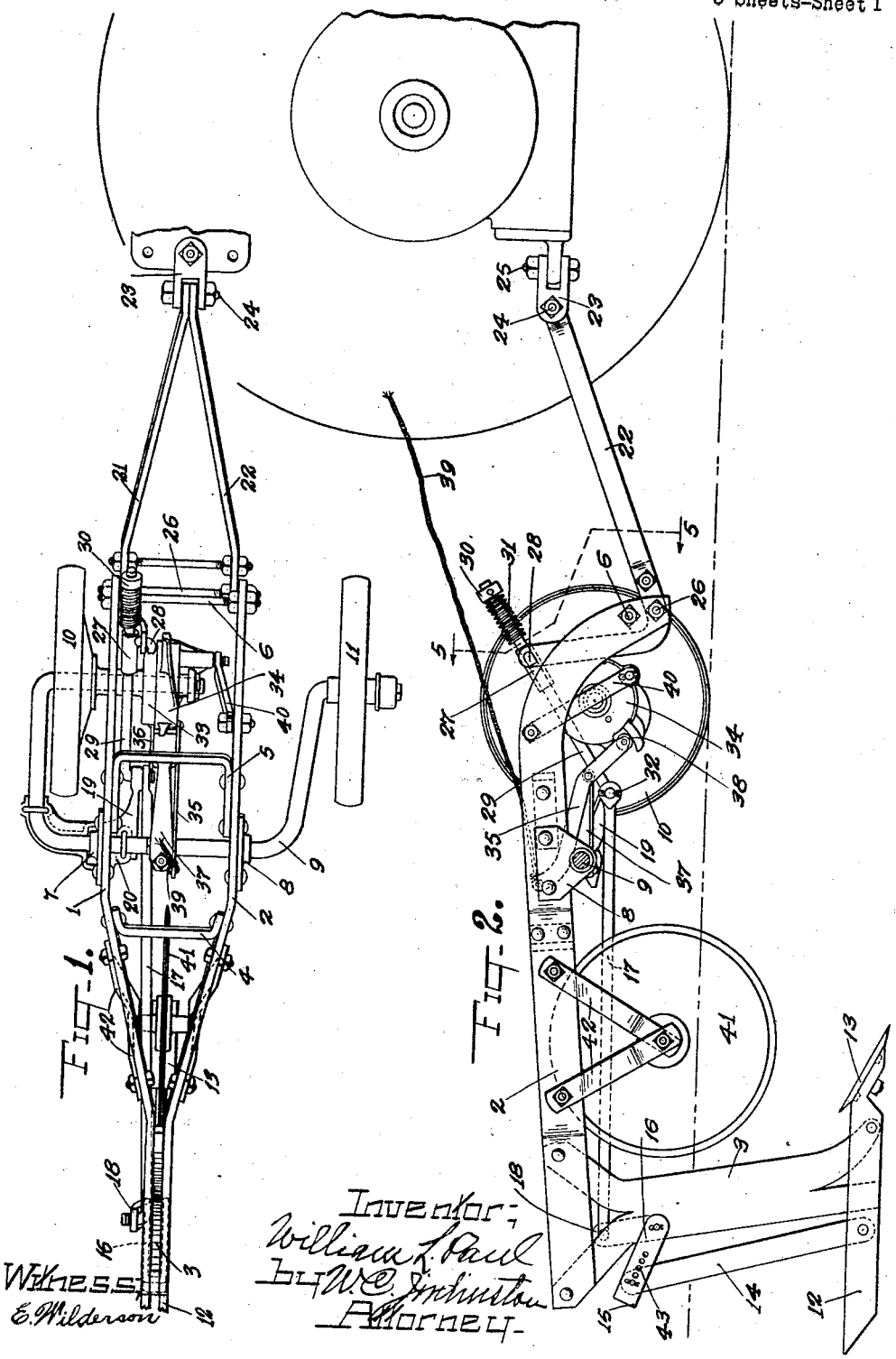

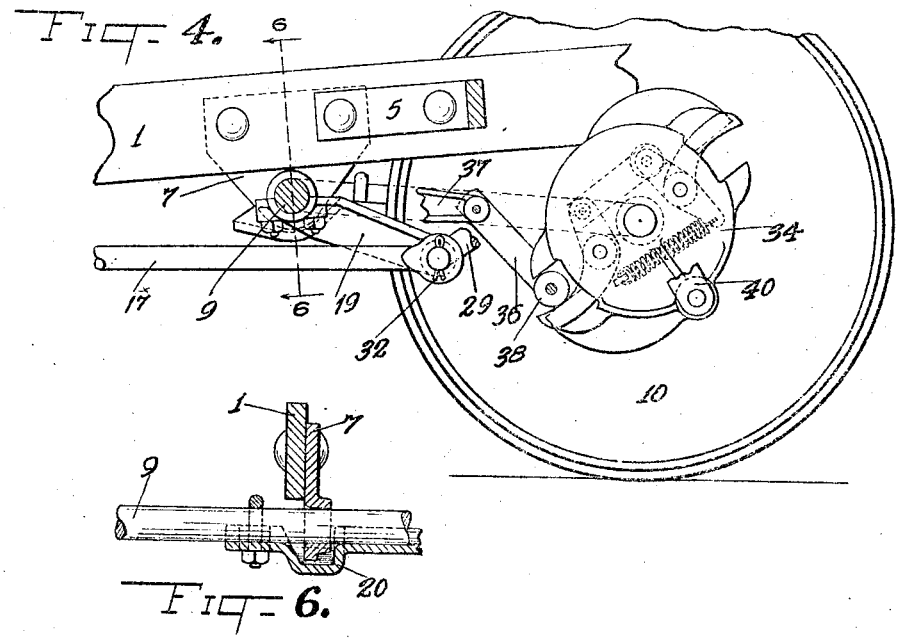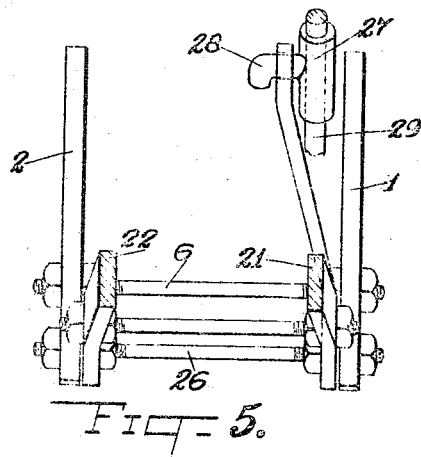

Patented Apr. 19, 1927.

1,625,278

UNITED STATES PATENT OFFICE.

WILLIAM L. PAUL, OF BERKELEY, CALIFORNIA, ASSIGNOR TO DEERE & COMPANY, OF MOLINE, ILLINOIS, A CORPORATION OF ILLINOIS.

SUBSOIL PLOW.

Application filed August 25, 1924. Serial No. 734,005.

My invention relates to subsoil plows, and has for its object adjustment of parts to regulate the depth of operation and to facilitate the withdrawal of the plow from the ground.

Referring to the drawings in which similar numerals indicate identical parts—

Figure 1 is a plan view of a wheeled power lift subsoil plow embodying my invention.

Figure 2 is a side elevation with the near wheel removed and the plow in the ground.

Figure 3 is a similar view to Figure 2 but showing the plow raised.

Figure 4 is an enlarged detail view of part of the power lift mechanism.

Figure 5 is an enlarged detail section on the line 5—5 of Figure 2, and

Figure 6 is a detail section on line 6—6 of Figure 4.

The plow frame is composed of side bars 1 and 2 parallel for part of their length and converging rearwardly to parallel terminations between which is rigidly secured a standard 3. The bars 1 and 2 are rigidly braced apart by braces 4, 5 and 6. Rockably journaled in bearings 7 and 8 on the frame is a crank axle 9 on which are mounted supporting wheels 10 and 11. The lower end of the standard 3 is projected forwardly and pivotally supported thereon is a shoe 12 carrying, rigidly mounted on its forward end or integral therewith, a plow blade 13. Pivotally connected to the shoe 12, rearward of the standard 3, is a link 14 attached at its upper end to an arm 15 of a bell crank 16 pivotally supported on the standard 3. A rod 17 is connected to the arm 18 and extends forwardly to pivotal attachment to an arm 19, the latter being preferably integral with a casting 20, rigidly secured on the axle 9 and projecting forwardly therefrom.

The plow is attached to the tractor by a draft frame composed of bars 21 and 22, pivotally connected recpectively to the frame bars 1 and 2 and converging forwardly to a shackle 23 to which they are attached by a horizontal pivot bolt 24, the shackle 23 being mounted on the rear of the tractor by a vertical pivot bolt 25. The forward portion of the plow frame bars 1 and 2 are bent downwardly at their forward termination. The bars 21 and 22 are attached to a pivot bolt 26. The bar 21 of the draft frame is bent upwardly rearward of the pivot 26 and its upper end is connected to a sleeve 27 by a hook 28, preferably integral with the sleeve 27, passing through a suitable hole in said end. I do not limit myself, however, to bending the bar 21 to provide an upward extension, for the extension can be made of a separate bar and attached to the bar 21 by suitable bolts. The sleeve 27 is slidably mounted on a rod 29 on which is secured a collar 30, and between the sleeve 27 and the collar 30, and on the rod 29, is a coiled spring 31. The rear end of the rod 29 is bent to pass through a hole in the arm 19 and an eye in the forward end of the rod 17, and is held in place by a cotter 32, and forms the pivotal connection of the rod 17 with the arm 19.

I lift the plow by traction power of one of the wheels operating mechanism between the wheel and the plow frame and including a clutch of a well known type, one part 33 of which is preferably integral with the hub of the wheel 10 and the second part 34 is loosely mounted on a crank end of the axle 9 parallel with the central portion thereof.

The parts of the clutch are held out of engagement when the plow is in operation, or raised for transportation, by a tripping lever formed of parallel parts 35 and 36 pivotally supported on an arm 37 rigidly mounted on the axle 9, and between their lower ends is mounted a roller 38 adapted to contact with a dog, commonly employed in clutches of this type, and so hold the two parts of the clutch disconnected. The part 35 of the tripping lever is extended beyond its pivot on the arm 37 and to its free end is attached a cable 39 which leads toward the tractor to within easy reach of the operator. A link 40 is pivotally attached to the part 34, adjacent the periphery thereof, and its upper end is pivotally connected to the plow frame bar 2. A rolling colter 41 is supported on a bracket 42 on the plow frame.

As shown in Figure 3, the plow is raised; now when it is desired to lower it a pull on the cable 39 will rock the tripping lever until the roller 38 is free of the dog with which it has been in contact, the plow dropping by gravity and the axle 9 rocking to move the wheels 10 and 11 forwardly and, at the same time, swinging the arm 19 in the same direction; this movement of the arm 19, through its connection with the bell crank 16 by the rod 17, rocks the bell crank 17 and as the shoe 12 is connected to the bell crank 17, by the link 14, the shoe is swung on its pivot on the standard 3 raising the heel of the shoe and, consequently, presenting the plow blade 13 at a sharp angle to the ground surface resulting, with the draft and the suck of the plow blade, in the plow quickly penetrating to the depth it is desired it should operate; the angle varying according to the adjustment of the link 14 with the arm 15 of the bell crank, such adjustment being provided for by a series of holes 43. The parts of the clutch are now separated and the trip lever has been released by the operator so that the roller 38 catches with one of the dogs to hold the clutch open, the link 40, by rotation of the clutch part 34 assuming the position shown in Figure 2.

When it is desired to raise the plow from operation, the trip lever is rocked, by pulling upon the cable 39, until the roller 38 and the contacting dog are separated; the parts of the clutch then engage and rotate with the wheel, with which they are connected, and as they rotate the link 40, pivotally connected to the part 34 and to the frame, raises the plow as the rotation of the wheel progresses. As before stated, the frame is pivoted at its forward end to the draft frame and the rear portion of the bar 21 of the latter is bent upwardly to hooked connection with the sleeve 27 on the rod 29; now the lifting force of the link 40 also tends to lift the rear end of the draft frame, because of the connection thereof to the plow frame, until the sleeve 27 contacts with the spring 31, partially compressing the latter and operating, when the plow is raised to the limit of its movement and the parts are as shown in Figure 3, to hold the plow resiliently until the tripping lever 35 is again operated and the plow allowed to drop to the ground. I have stated that the plow when raised is held resiliently, but it is evident that as the plow is pivotally attached to the draft frame by the pivot bolt 26 and the draft frame connected to the tractor by the pivot bolt 24, and the part 34 of the clutch being loosely mounted upon the wheel part of the axle, but out of engagement with the part 33, the plow, as a whole, is held up by the rod 29, connected to the vertical part of the draft frame bar 21; the spring 31, between the collar 30, on the end of the rod 29, and the sleeve 27 to which the vertical part of the draft frame bar is connected, operating to resist the pull of the rod 29, and providing that degree of resiliency sufficient to withstand jarring and jolting effect of travel.

The downward and rearward movement of the arm 19, as the plow rises and the axle 9 rocks downwardly and rearwardly, imparts a rearward longitudinal thrust to the bar 17 to rock the bell crank 16, with which the shoe 12 is connected by the link 14, so that the thrust of the rod 17 actuates the bell crank to rock the shoe 12, depressing the heel thereof and materially reducing the suck of the plow blade 13 as the plow rises, and so facilitating the ease of breaking the plow from the ground, which is added to by the cut of the colter 41 operating, preferably, directly over the plow blade 13. The supporting wheels 10 and 11 are located so that their pressure upon the ground presents no resistance to the rise of the plow to the surface.

What I claim is:

1. In a traction drawn power lift sub-soil plow, the combination with a frame, an axle and supporting wheels, of a support on the rear of the frame, a shoe rockably mounted on said support, a plow blade on the shoe, power actuated mechanism operable to rock the axle to raise the plow, and means coacting with said mechanism and operating to simultaneously rock the shoe to vary the angularity of the plow blade relative to the ground as the plow is raised or lowered.

2. In a traction drawn power lift sub-soil plow, the combination with a frame, an axle and supporting wheels, of a support on the rear of the frame, a shoe rockably mounted on the support, a plow blade rigid on the shoe, power actuated mechanism operable to rock the axle to raise the plow, and means connecting said axle with the shoe to impart a simultaneous rocking movement to the shoe to vary the angularity of the plow blade with the ground as the plow is raised or lowered.

3. In a traction drawn power lift sub-soil plow, the combination with a frame, an axle and supporting wheels, of a support on the rear of the frame, a shoe rockably mounted on the support, a plow blade rigid on the shoe, power actuated mechanism operable to rock the axle to raise the plow, a rocking element mounted on the support and connected with the shoe and the axle and actuated by rocking the axle to simultaneously rock the shoe and vary the angle of the plow blade as the plow is raised or lowered.

4. In a traction drawn power lift sub-soil plow, the combination with a frame, an axle and supporting wheels, of a support on the rear of the frame, a shoe rockably mounted on the support, a plow blade rigid on the shoe, an arm rigid on the axle, a rocking element mounted on the support and connected with said arm, a link connecting said member with the shoe, and power actuating mechanism operable to rock the axle to raise the plow and simultaneously actuate said member to rock the shoe and vary the angularity of the plow blade relative to the ground as the plow is raised or lowered.

5. In a traction drawn power lift subsoil plow, the combination with a frame, an axle and supporting wheels, of a support on the rear of the frame, a shoe rockably mounted on said support having a plow blade thereon, an arm rigid on the axle, a rocking element mounted on the support and connected with said arm, a link connecting said member with the shoe, power actuated mechanism operable to rock the axle to raise the plow and simultaneously actuate said member to rock the shoe and vary the angularity of the plow blade relative to the ground as the plow is raised or lowered, and means to adjust the connection of said member with the shoe.

6. In a traction drawn power lift subsoil plow, the combination with a frame, an axle and supporting wheels, of a plow supported on the frame, a draft frame pivotally attached to the plow frame by a horizontal pivot and having one of its sides extended and bent upwardly, power actuated mechanism operable to rock the axle to raise the plow, an arm rigid on the axle, a rod pivoted to said arm and extending forwardly, a sleeve slidably mounted on said rod and pivotally attached to the upward extension of the draft frame side, a collar on the forward end of the rod and a coiled spring between said sleeve and collar cooperating therewith to yieldingly hold the plow in a raised position.

7. In a traction drawn power-lift subsoil plow, the combination with a frame, an axle and supporting wheels, of a plow supported on the frame, a draft frame pivotally attached to the plow by a horizontal pivot, an upwardly extending member on said draft frame, power actuated mechanism operable to rock the axle to raise the plow, an arm rigid on the axle, a rod pivotally connected to said arm and extending forwardly and having a sliding connection to said upwardly extending member, and a coiled spring on said rod between the forward end thereof and said member.

8. In a traction drawn power lift plow, the combination with a frame, an axle and supporting wheels, of a plow supported on the frame, a draft frame pivotally attached to the plow frame by a horizontal pivot, power actuated mechanism operable to rock the axle to raise the plow, an arm rigid on the axle, and resilient means connecting said arm and draft frame operating to hold the plow in a raised position.

WILLIAM L. PAUL.